(12) United States Patent
Zhan et al.

(10) Patent No.: US 11,246,274 B2
(45) Date of Patent: Feb. 15, 2022

(54) PLANTING DEVICE, MULTILAYER STEREO-PLANTING SYSTEM AND PLANTING SYSTEM OF PLANT FACTORY

(71) Applicant: FUJIAN SANAN SINO-SCIENCE PHOTOBIOTECH CO., LTD., Quanzhou (CN)

(72) Inventors: Zhuo Zhan, Xiamen (CN); Ying Chen, Xiamen (CN); Zhiyin Li, Xiamen (CN)

(73) Assignee: FUJIAN SANAN SINO-SCIENCE PHOTOBIOTECH CO., LTD., Quanzhou (CN)

(*) Notice: Subject to any disclaimer, the term of this patent is extended or adjusted under 35 U.S.C. 154(b) by 446 days.

(21) Appl. No.: 16/474,548

(22) PCT Filed: Oct. 27, 2017

(86) PCT No.: PCT/CN2017/107940
§ 371 (c)(1),
(2) Date: Jun. 28, 2019

(87) PCT Pub. No.: WO2019/071656
PCT Pub. Date: Apr. 18, 2019

(65) Prior Publication Data
US 2020/0120884 A1    Apr. 23, 2020

(30) Foreign Application Priority Data
Oct. 10, 2017    (CN) .......................... 201710936585.1

(51) Int. Cl.
*A01G 31/06*    (2006.01)
*A01G 7/02*    (2006.01)
*A01G 7/04*    (2006.01)
*A01G 31/00*    (2018.01)

(52) U.S. Cl.
CPC ............... *A01G 31/06* (2013.01); *A01G 7/02* (2013.01); *A01G 7/045* (2013.01); *A01G 2031/006* (2013.01)

(58) Field of Classification Search
CPC .. A01G 31/06; A01G 2031/006; A01G 7/045; A01G 7/02; A01G 9/18;
(Continued)

(56) References Cited

U.S. PATENT DOCUMENTS

2012/0279127 A1    11/2012    Yusibov et al.
2013/0019527 A1    1/2013    Howe-Sylvain
(Continued)

FOREIGN PATENT DOCUMENTS

CN    202635277 U    1/2013
CN    202750548 U    2/2013
(Continued)

*Primary Examiner* — Trinh T Nguyen
(74) *Attorney, Agent, or Firm* — Bayramoglu Law Offices LLC (57) ABSTRACT

A planting device, a multilayer stereo-planting system using the planting device, and a planting system of a plant factory using the multilayer stereo-planting system are provided. The planting device includes the planting tray and the planting board which can be moved as a whole. The nutrient solution inlet and the nutrient solution outlet are located on the same side of the planting tray. The multilayer stereo-planting system includes the support rack and the nutrient solution supply system installed on the support rack. The planting device can be detachably installed on the support rack as a whole. The planting tray and the planting board of the planting device can be taken out and placed in together, protects the plant seedlings from injuries, and avoids the leakage phenomenon of the nutrient solution.

18 Claims, 8 Drawing Sheets

(58) Field of Classification Search
CPC ...... A01G 9/20; A01G 27/001; A01G 27/003; A01G 27/006; A01G 27/02; A01G 27/005; A01G 31/02
See application file for complete search history.

(56) References Cited

U.S. PATENT DOCUMENTS

| | | | |
|---|---|---|---|
| 2014/0069009 A1 | 3/2014 | Lin | |
| 2015/0282444 A1* | 10/2015 | Butler | A01G 31/02 47/62 C |
| 2017/0027110 A1* | 2/2017 | Ito | A01G 9/249 |
| 2017/0094920 A1* | 4/2017 | Ellins | A01G 31/02 |
| 2017/0172084 A1* | 6/2017 | Fox | A01G 24/00 |
| 2019/0183062 A1* | 6/2019 | Pham | A01G 9/022 |
| 2019/0246584 A1* | 8/2019 | Hsueh | A01G 31/02 |
| 2019/0261589 A1* | 8/2019 | Pham | A01G 9/0297 |
| 2019/0335691 A1* | 11/2019 | Krakover | A01G 31/06 |
| 2020/0120884 A1 | 4/2020 | Zhan et al. | |
| 2020/0359568 A1* | 11/2020 | Twito | A01G 27/006 |
| 2021/0169027 A1* | 6/2021 | Raymond | A01K 63/047 |

FOREIGN PATENT DOCUMENTS

| | | |
|---|---|---|
| CN | 202759950 U | 3/2013 |
| CN | 202958376 U | 6/2013 |
| CN | 104206245 A | 12/2014 |
| CN | 203985386 U | 12/2014 |
| CN | 205987811 U | 3/2017 |
| CN | 107072161 A | 8/2017 |
| CN | 107750935 A | 3/2018 |
| CN | 207461066 U | 6/2018 |
| CN | 207461072 U | 6/2018 |
| CN | 207461073 U | 6/2018 |
| DE | 202012006215 U1 | 11/2012 |
| EP | 3005859 A1 | 4/2016 |
| EP | 3586609 A1 | 1/2020 |
| JP | H07231731 A | 9/1995 |
| JP | H10136790 A | 5/1998 |
| JP | 3952220 B2 | 8/2007 |
| JP | 3176525 U | 6/2012 |
| JP | 3180721 U | 1/2013 |
| KR | 20130101865 A | 9/2013 |
| WO | 2019071656 A1 | 4/2019 |

\* cited by examiner

PLANTING DEVICE, MULTILAYER STEREO-PLANTING SYSTEM AND PLANTING SYSTEM OF PLANT FACTORY

CROSS REFERENCE TO THE RELATED APPLICATIONS

This application is the national phase entry of International Application No. PCT/CN2017/107940, filed on Oct. 27, 2017, which is based upon and claims priority to Chinese Patent Application No. 201710936585.1, filed on Oct. 10, 2017, the entire contents of which are incorporated herein by reference.

TECHNICAL FIELD

The present invention relates to the technical field of stereo-planting, in particular to a planting device mainly used for the multilayer stereo-planting, a multilayer stereo-planting system using the planting device, and a planting system of a plant factory using the multilayer stereo-planting system.

BACKGROUND

The existing hydroponic bed structure for growing plants is mainly composed of a planting rack, LED lights, grow beds, planting boards, and corresponding nutrient solution circulation pipelines, etc. The LED lights and the grow beds are fixed on the rack structure, and the planting boards are placed in the grow beds. During the cultivation process, the planting boards are taken out or put in together with the plants, so as to achieve the cycle planting of plants. At present, the majority of plant factories aim to achieve the constant production of plants all year around and harvest a constant amount of vegetables every day. To this end, the operations such as sowing, planting, harvesting and the like are regularly performed in the factory every day. One planting area may be planted with plants of different species and the same species of plants of different grow stages. In some plant factories using beds and racks, one grow bed may even be planted with plants of different grow stages, resulting in the mutual interference between planting and harvesting. Especially, being unable to change the nutrient solutions and clean the planting right after the harvesting leads to the problems such as the ion imbalance of nutrient solutions, the algae and bacteria breeding in the grow beds and so on.

Meanwhile, when the vegetables are taken out and put in the grow bed frame together with the board, the roots of the plants will be separated from the nutrient solution in the grow bed. As a result, problems such as the root system injury, the leaf drop, the nutrient solution spilling and the like, will be caused, thereby affecting the quality of the seedlings. During transportation, the nutrient solution is dropped on the passage, which causes big troubles to production management.

Moreover, growing plants under an artificial light source is essentially characterized by the multilayer stereo-planting in the closed factory building, which can greatly improve the land utilization rate and achieve the efficient output. The more the stereo layers, the higher the utilization rate of the factory building, and the larger the effective planting area. However, in order to achieve the stereo-planting with more layers in height, it is increasingly difficult to design the factory building with an increase in the layer number. There are many technical problems in aspects such as the load of the planting device, the difficulty and safety in climbing up and down the rack, the automation degree, the accurate adjustment and control of the nutrient solution and the environmental control system, etc. In most current plant factories, the stereo-planting system usually has six, seven, or less layers. It is uncommon to see the use of a stereo-planting system with 20-30 layers or more. Besides, in the planting factory building of a large number of layers in height, it is also problematic to clean each layer of the planting rack, so that increased labor consumption is caused. Further, the operators are required to climb up to each layer by using tools to do the cleaning. The limited space of each planting layer increases the difficulty for operations, and the high factory building also puts potential risks on the operators working high above the ground.

SUMMARY

In view of the above-mentioned disadvantages in the prior art, the basic objective of the present invention is to provide a planting device, a multilayer stereo-planting system using the planting device, and a planting system of a plant factory using the multilayer stereo-planting system. The planting tray and the planting board of the planting device can be moved as a whole, which solves the problems caused by the fact that the planting board and the grow bed cannot be moved simultaneously.

In order to achieve the above-mentioned objectives and the other related objectives, an embodiment of the present invention provides a planting device including a planting tray and a planting board. The planting tray includes a bottom plate and a sidewall. The planting tray includes a nutrient solution inflow and outflow area and a planting area. The planting board is placed in the planting area. The nutrient solution inflow and outflow area includes a nutrient solution inflow area and a nutrient solution outflow area. The nutrient solution inflow area and the nutrient solution outflow area are located on the same side of the planting tray. The sidewall of the same side of the planting tray serves as a sidewall of the nutrient solution inflow and outflow area. The nutrient solution inflow area and the nutrient solution outflow area are separated by a partition member connected to the sidewall of the nutrient solution inflow and outflow area. A nutrient solution inlet is provided on a top of the planting tray at the nutrient solution inflow and outflow area, and a nutrient solution outlet is provided on the bottom plate of the planting tray at the nutrient solution outflow area. A middle partition plate is provided inside the planting tray. The middle partition plate is connected to the partition member, and the middle partition plate extends along a direction perpendicular to the sidewall of the nutrient solution inflow and outflow area in the planting area. Further, a gap is provided between the middle partition plate and the sidewall of the planting tray at a side opposite to a side of the sidewall of the nutrient solution inflow and outflow area.

In one embodiment, a side partition plate is provided inside the planting tray. The side partition plate is arranged in parallel to the sidewall of the nutrient solution inflow and outflow area, and the side partition plate separates the nutrient solution inflow and outflow area from the planting area. A liquid inflow buffer tank is defined by the partition member, the sidewall of the nutrient solution inflow and outflow area, and the side partition plate located in the nutrient solution inflow area. The side partition plate located in the nutrient solution inflow area is provided with a nutrient solution inflow port. The side partition plate located in the nutrient solution outflow area is provided with a nutrient solution outflow port.

In one embodiment, the planting tray is provided with a liquid receiving tank. The liquid receiving tank includes a bottom plate, two sidewalls opposite to each other, and an end wall. An end of the liquid receiving tank opposite to the end wall is an open end. The liquid receiving tank is fixed at the nutrient solution inlet of the planting tray. The open end faces toward the nutrient solution inflow area.

In one embodiment, a plurality of liquid blocking ribs parallel to the sidewall of the nutrient solution inflow and outflow area are provided on the bottom plate of the planting tray at the planting area to divide the planting area into a plurality of liquid storage areas.

In one embodiment, a filter is provided at the nutrient solution outflow port. The filter includes a full-filtration screen and a semi-filtration screen. Each filter screen includes a laterally placed rectangular base plate and a filter mesh installed in an opening of the base plate. The two base plates are parallel to each other and identical in height. The two base plates are fixed together with a gap between them. A height of a filter mesh of the semi-filtration screen is less than a height of the filter mesh of the full-filtration screen.

In one embodiment, two ends of the filter are respectively embedded in the side partition plates at two sides of the nutrient solution outflow port in a snap-fit manner.

In one embodiment, the present invention provides a multilayer stereo-planting system, including a support rack, a nutrient solution supply system installed on the support rack, and a planting device according to any embodiment described above. The planting device is installed on the support rack and can be disassembled as a whole. The nutrient solution supply system includes a main nutrient solution pipeline installed on a top of the support rack, funnel-type flow guiding devices, and a liquid discharging pipe installed on a bottom of the support rack. The funnel-type flow guiding devices are installed on each layer of the support rack, and the funnel-type flow guiding devices are located above the nutrient solution inlet of the planting device. Further, the funnel-type flow guiding devices are arranged as one line or multiple lines along a vertical center line from top to bottom.

In one embodiment, the multilayer stereo-planting system includes a ventilation and heat dissipation system. The ventilation and heat dissipation system includes a main cool air pipeline and a main $CO_2$ pipeline which are installed at the top of the support rack, and a branch cool air pipeline and a branch $CO_2$ pipeline which respectively extend downward from the main cool air pipeline and the main $CO_2$ pipeline. The branch cool air pipeline and the branch $CO_2$ pipeline are each provided with a plurality of air outlets at each layer of the support rack.

In one embodiment, the multilayer stereo-planting system includes light source modules installed on each layer of the support rack.

In one embodiment, the present invention provides a planting system of a plant factory including a multilayer stereo-planting system according to any embodiment described above.

The planting tray and the planting board of the planting device provided by the present invention can be placed in or taken out together, and transported as a whole. As a result, the plant seedlings can be protected from injuries, and the leakage and dropping of the nutrient solution can be avoided, thereby facilitating the cleaning management of the production workshop. Each planting device is independently taken out and placed in without affecting the growth of other plants on the support rack. Thus, the problem in separately managing the plants of different species or the plants of the same species but different growth stages in the same workshop can be solved, and the production management is simplified. The modularization of the planting device also facilitates the use of mechanical automation. The multilayer stereo-planting system provided by the present invention solves the problems in the stereo-planting, especially the problems in aspects of liquid supplying, automatic operation, planting device, pipeline cleaning, and environmental control, etc. of stereo-planting with a large amount of layers in height.

The description of the reference designators is as follows.
1: planting device;
10: planting tray;
101: nutrient solution inlet;
102: nutrient solution outlet;
103: middle partition plate;
104: planting tray bottom plate;
105: planting tray sidewall;
106: side partition plate;
1061: nutrient solution inflow port;
1062: nutrient solution outflow port;
107: partition member;

108: liquid inflow buffer tank;
109: liquid receiving tank;
1091: liquid receiving tank bottom plate;
1092: liquid receiving tank sidewall;
1093: liquid receiving tank end wall;
1094: liquid receiving tank open end;
1095: limiting notch;
110: limiting plate;
120: liquid blocking rib;
130: filter;
131: full-filtration screen;
1311: base plate;
1312: filter mesh;
132: semi-filtration screen;
1321: base plate;
1322: filter mesh;
133: vertical plate;
134: pillar;
135: overflow discharge port;
136: extension segment;
137: vertical rib;
20: planting board;
201: planting hole;
21: main nutrient solution pipe;
22: funnel-type flow guiding device;
23: liquid discharging pipe;
24: liquid supply pipe;
25: liquid recycle pipe;
31: main cool air pipeline;
32: branch cool air pipeline;
33: main $CO_2$ pipeline;
34: branch $CO_2$ pipeline;
35: air outlet;
4: light source module;
51: main support rack;
52: secondary support rack;

DETAILED DESCRIPTION OF THE EMBODIMENTS

The implementations of the present invention are described hereinafter through the specific embodiments. A person skilled in the art can readily understand other advantages and functions of the present invention according to the disclosure of the present description.

It should be noted that the structure, proportion, size, and the like that are illustrated in the drawings are merely used for the purpose of illustrating the disclosure of the specification, so a person familiar with the technique can read and understand it, rather than limit the implementable limit condition of the present invention. Thus, technically, these features are not essential. Any structural modifications, proportional relationship changes, or size adjustments without affecting the effects and results that can be achieved by the present invention should still be considered as falling within the scope covered by the disclosure of the present invention. Meanwhile, the terms such as "upper", "lower", "left", "right", "middle", "one", etc. recited in the present description are merely for the purpose of concise description rather than limiting the implementable scope of the present invention. The changes or adjustments of the relative relationship without a substantial modification to the technical solution are regarded as being covered by the scope of the present invention.

The present invention provides a multilayer stereo-planting system which is suitable for the stereo-planting in the space of a high factory building with multiple layers and other applicable sites. The multilayer stereo-planting system includes a nutrient solution supply system and a planting device capable of being moved as a whole, and may further include a ventilation and heat dissipation system and a light source module. Each multilayer stereo-planting system forms an independent unit which can be used independently or a plurality of multilayer stereo-planting systems may be connected in parallel to form a planting system for the plant factory. In the planting system, each individual unit is operated relatively independently, and the planting in the units is irrelevant to each other. Moreover, the layer number and the planting height of each unit can be customized. Taking the following embodiment for instance, the multilayer stereo-planting system and the components thereof provided by the present invention will be described hereinafter.

Figure 1:
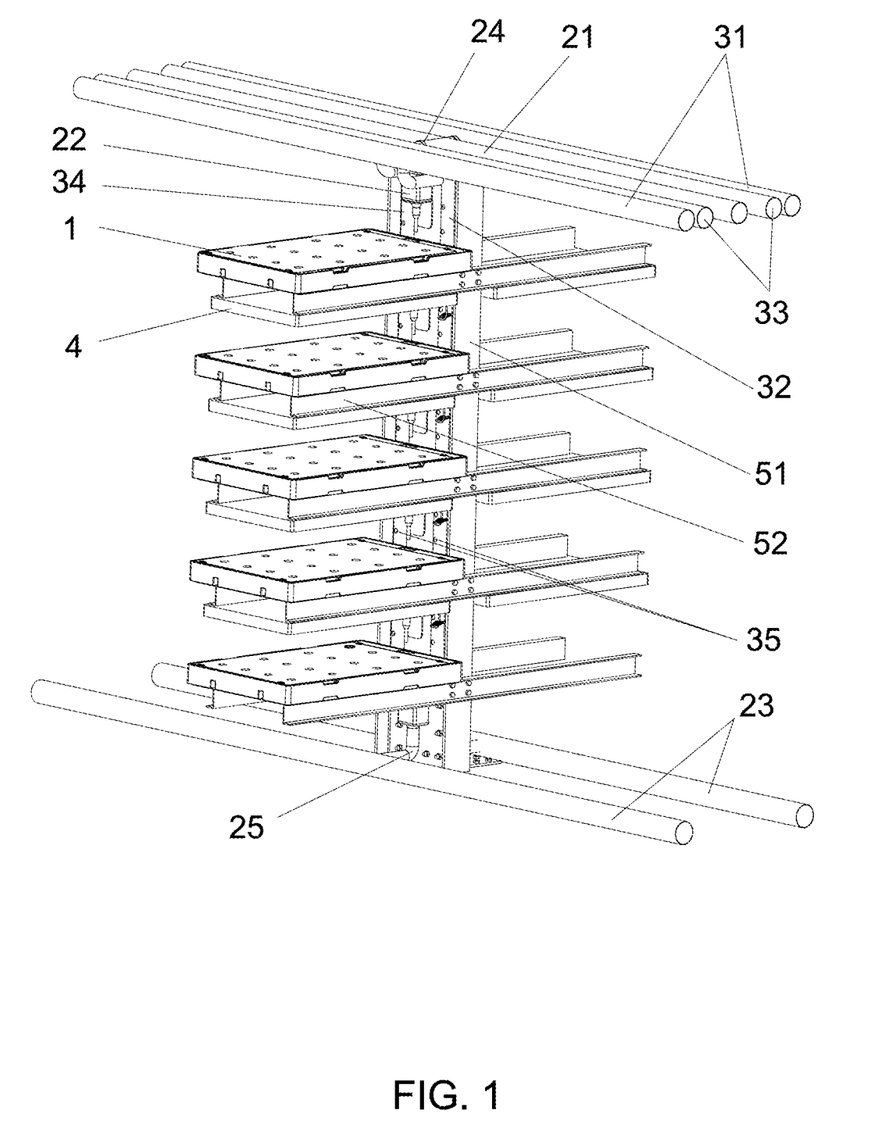
FIG. 1 is a perspective structural schematic diagram showing a multilayer stereo-planting system according to one embodiment of the present invention.
Figure 2:
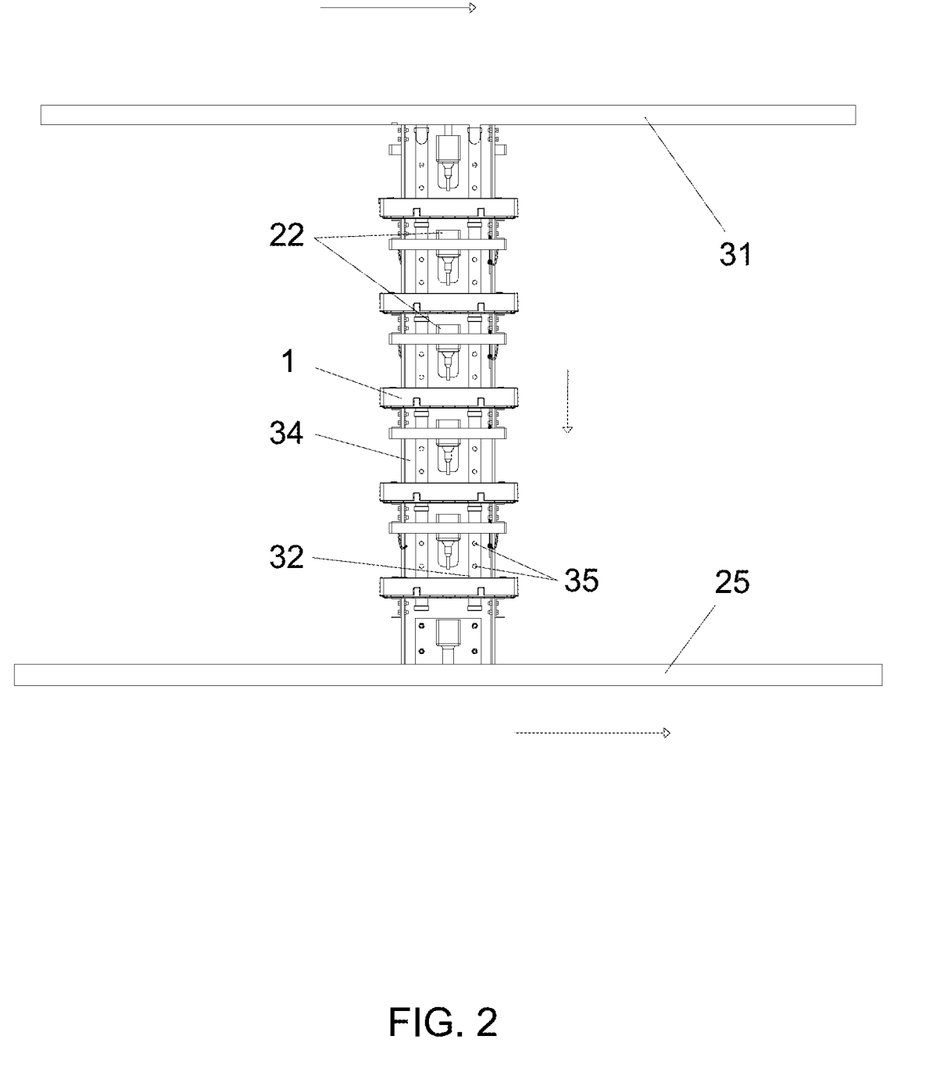
FIG. 2 is a front structural schematic diagram of the multilayer stereo-planting system shown in FIG. 1.

As shown in FIGS. 1 and 2, the planting device 1, the nutrient solution supply system, the ventilation and heat dissipation system, and the light source module 4 of the multilayer stereo-planting system are all installed on the support rack. The support rack may be any type of support structure such as a corbel type, a storage shelf type, etc. In the present embodiment, a corbel-type support rack is taken as an example. The support rack includes the vertical main support rack 51 which may be made of the I-section steel, and the multiple layers of horizontal secondary support racks 52 which are installed on the main support rack 51 from top to bottom. The horizontal secondary support racks 52 may be made of the U-section steel. The secondary support rack 52 may be fixed on the main support rack 51 or adjustable for positions. For example, a plurality of installation positions for the secondary support racks are arranged on the main support rack 51; each layer of secondary support rack 52 is detachably fixed at the installation position, and the layer height can be adjusted according to the requirement.

The nutrient solution supply system includes the nutrient solution main pipeline 21, the funnel-type flow guiding device 22, and the liquid discharging pipe 23. The nutrient solution main pipeline 21 is installed at the top of the support rack, and supplies the nutrient solution to the funnel-type flow guiding device 22 through the liquid supply pipe 24. The nutrient solution main pipeline 21 is interconnected to the inlet of the nutrient solution supply pipe 24, and the outlet of the nutrient solution supply pipe 24 is interconnected to the funnel-type flow guiding device 22 located below the nutrient solution supply pipe 24. Specifically, the outlet of the nutrient solution supply pipe 24 may be connected to the inlet of the funnel-type flow guiding device 22, or the outlet of the nutrient solution supply pipe 24 may be placed inside or above the inlet of the funnel-type flow guiding device 22 without a direct connection. The upper side of each layer of secondary support rack 52 is provided with one funnel-type flow guiding device 22. Each of the funnel-type flow guiding devices 22 includes an inlet and an outlet. All the funnel-type flow guiding devices 22 are installed on the main support rack 51, and arranged along the vertical centerline from top to bottom, so that the nutrient solution can directly flow from the funnel-type flow guiding device 22 on the upper layer to the funnel-type flow guiding device 22 on the lower layer without the planting device. The liquid discharging pipe 23 is provided below the secondary support rack 52 on the lowermost layer. The liquid discharging pipe 23 is interconnected to the outlet of the liquid recycle pipe 25. The inlet of the liquid recycle pipe 25 is funnel-type, and is located right below the nutrient solution outlet of the planting device on the lowermost layer. The nutrient solution supply system further includes a nutrient solution tank (not shown in the drawing). The nutrient solution is transported to the nutrient solution main pipeline through a circulation pump (not shown in the drawing) and a liquid dispenser (not shown in the drawing). A solenoid valve (not shown in the drawing) may be provided between the nutrient solution tank and the circulation pump, between the circulation pump and the liquid distributor, between the liquid distributor and the nutrient solution main pipeline, and/or between the nutrient solution main pipeline and the nutrient solution supply pipe to control the flow rate of the nutrient solution. The nutrient solution recycled by the liquid discharging pipe 23 can reflow to the nutrient solution tank for recycling after being treated by processes such as sterilization, filtration, and the like. The arrows in FIG. 2 show the flow direction of the nutrient solution.

The ventilation and heat dissipation system includes the main cool air pipeline 31 and the branch cool air pipeline 32. The $CO_2$ system includes a main $CO_2$ pipeline 33 and a branch $CO_2$ pipeline 34. The main cool air pipeline 31 and the main $CO_2$ pipeline 33 are installed at the top of the support rack. The branch cool air pipeline 32 and the branch $CO_2$ pipeline 34 are respectively located on both sides of the liquid supply pipe 24, and respectively extend downwards along the main support rack 51 from the main cool air pipeline 31 and the main $CO_2$ pipeline 33 to the bottom end of the main support rack 51, at least on the upper side of the secondary support rack 52 on the lowermost layer. A plurality of air outlets 35 are provided on the branch cool air pipeline 32 and the branch $CO_2$ pipeline 34 on the upper side of each layer of secondary support rack 52 to supply the cooling air and the $CO_2$ to the planting device 1 and the plants planted in the planting device 1. In the present embodiment, the light source module 4 is an LED light source module, which is installed on each layer of the support rack, and is suspended below the secondary support rack 52. Each light source module 4 has a power interface in a parallel connection to the three-way main cable. The light source is modularized, so the light source can be directly disassembled and replaced after damage, which facilitates the maintenance.

Figure 3:
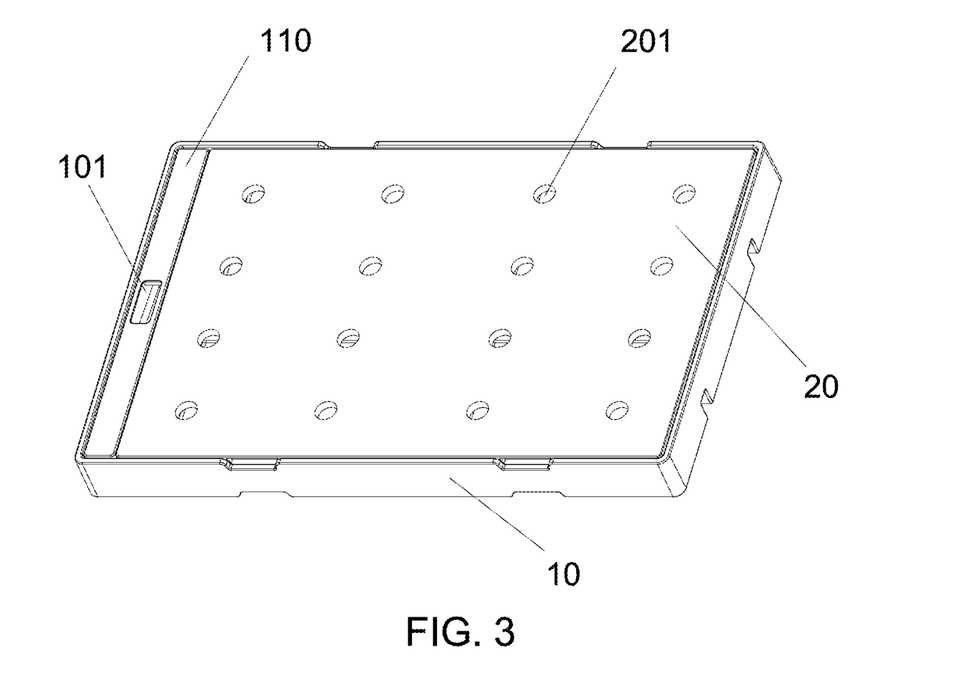
FIG. 3 is a perspective structural schematic diagram showing a planting device according to one embodiment of the present invention.
Figure 4:
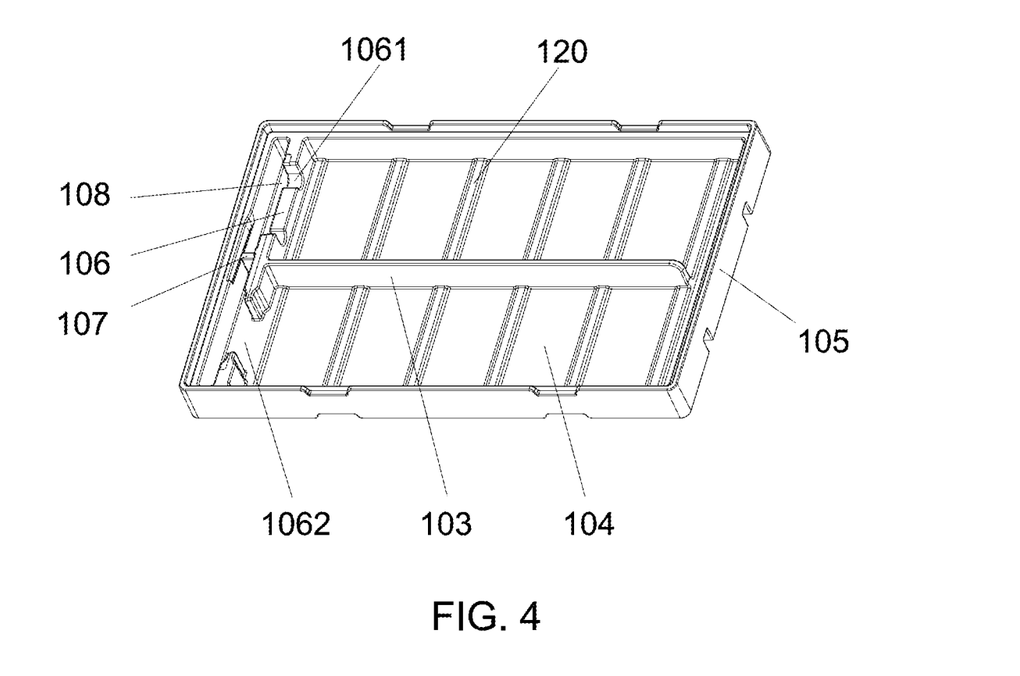
FIG. 4 is a perspective structural schematic diagram showing a planting tray according to one embodiment of the present invention.
Figure 5:
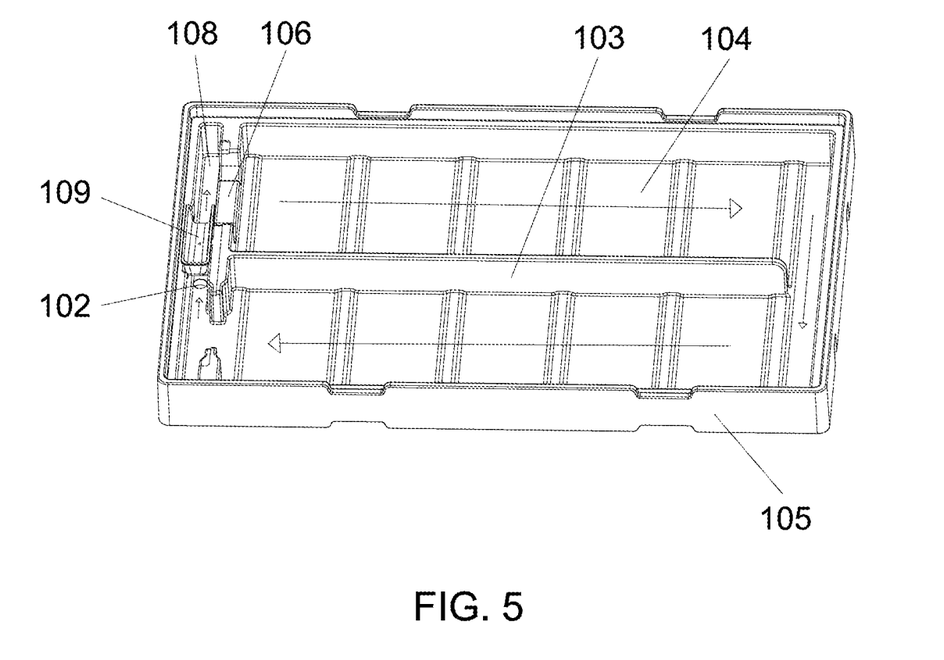
FIG. 5 is a perspective structural schematic diagram showing a planting tray provided with a liquid receiving tank according to one embodiment of the present invention.
Figure 14:
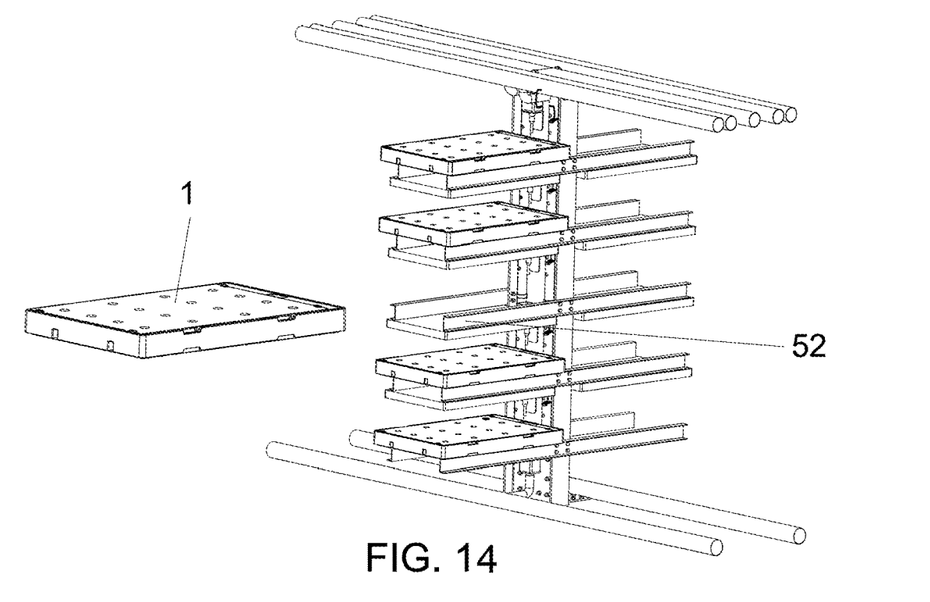
FIG. 14 is an installation schematic diagram showing that the planting device is taken out and placed in the multilayer stereo-planting system shown in FIG. 1.

As shown in FIG. 3, the planting device 1 is a device used for cultivating plants, which includes the planting tray 10 and the planting board 20. The planting board 20 is located at the top of the planting tray 10, and is provided with a plurality of planting holes 201 for placing the planting cups (not shown in the drawings). The plant is planted in the planting cup, and the root of the plant is inserted into the planting tray 10. The nutrient solution inlet 101 is provided at the top of the planting tray 10, and the nutrient solution outlet 102 (as shown in FIG. 5) is provided at the bottom of the planting tray 10. After the planting tray 10 is installed on the secondary support rack 52 of the support rack, the nutrient solution inlet 101 is interconnected to the outlet of the funnel-type flow guiding device 22 on the same layer, and the nutrient solution outlet 102 is interconnected to the inlet of the funnel-type flow guiding device 22 on the lower layer. Specifically, the above-mentioned interconnection is in a detachable or plug-in manner, or is in an up-down positional arrangement without a direct connection. When the latter mode is adopted, the nutrient solution inlet 101 and the nutrient solution outlet 102 are located on the same side of the planting tray 10. When the planting device 1 is installed in position, the nutrient solution inlet 101 is located below the outlet of the funnel-type flow guiding device 22 on the same layer, and the nutrient solution outlet 102 is located above the inlet of the funnel-type flow guiding device 22 on the lower layer. As shown in FIG. 4, in this case, the middle partition plate 103 is provided inside the planting tray 10. A gap is provided between the middle partition plate 103 and the planting tray sidewall 105 on the opposite side of the nutrient solution inlet 101 and the nutrient solution outlet 102. An O-shaped flow route of the nutrient solution from the nutrient solution inlet 101 to the nutrient solution outlet 102 is formed in the planting tray 10. The planting device 1 is modularized, so that the planting tray 10, the planting board 20, and the plants planted in the planting device 1 can be moved as a whole, and installed on or removed from the support rack, preferably are combined with the secondary support rack in the plug-in manner. For example, as shown in FIG. 14, the planting device 1 can be inserted into or removed from the secondary support rack 52 by a forklift.

In the multilayer stereo-planting system of the above-mentioned embodiment, as shown in FIG. 1, the secondary support rack 52 can be symmetrically arranged on both sides of the main support rack 51. Accordingly, the liquid supply pipe 24, the funnel-type flow guiding device 22, the branch cool air pipeline 32, the branch $CO_2$ pipeline 34, the liquid discharging pipe 24, and the liquid recycle pipe 25, etc. are also symmetrically arranged on both sides of the main support rack 51.

Figure 15:
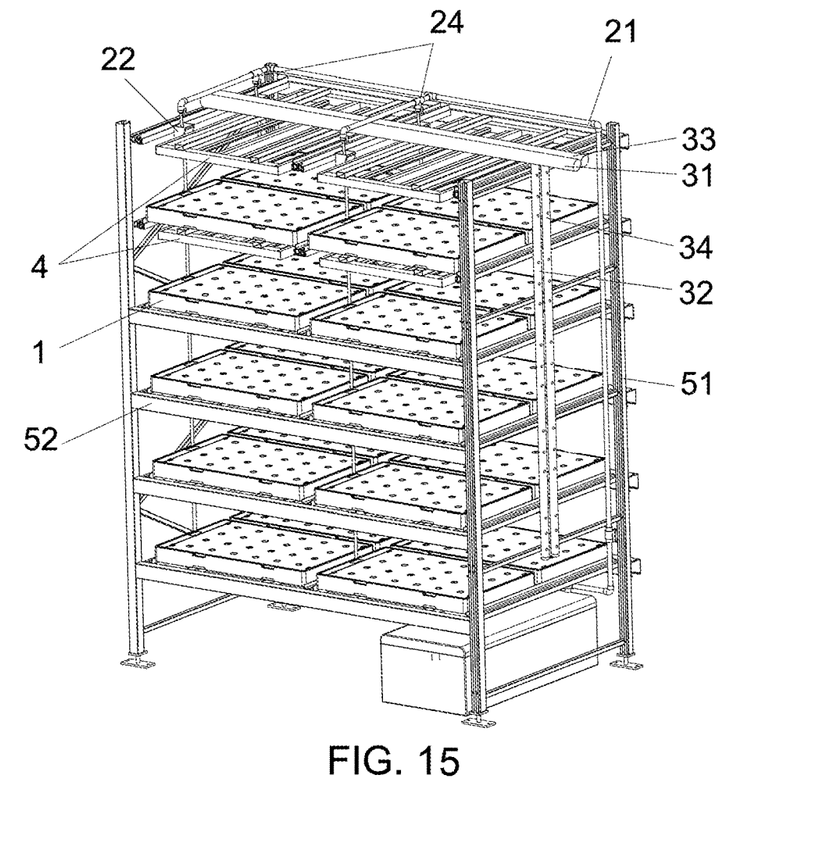
FIG. 15 is a perspective structural schematic diagram showing a multilayer stereo-planting system according to another embodiment of the present invention.

FIG. 15 shows an embodiment of the storage-shelf-type support rack. The main support rack 51 includes a plurality of vertical pillars and horizontal or sloped bars connected between the pillars, and the secondary support rack 52 is horizontally installed on the main support rack 51. FIG. 15 merely shows the basic structure of the storage-shelf-type support rack, and more layers and more combinations may be set according to actual needs.

FIGS. 3 and 4 show a planting device according to one embodiment of the present invention. The planting device includes the planting tray 10 and the planting board 20. The planting tray 10 includes the bottom plate 104 and the sidewalls 105. The planting tray 10 is divided into a planting area and a nutrient solution inflow and outflow area. The planting board 20 is put in the planting area. The nutrient solution inflow and outflow area is defined between one of the sidewalls 105 of the planting tray 10 and the side partition plate 106 parallel to the inner side of the sidewall 105, and the nutrient solution inflow and outflow area and the planting area re separated by the side partition plate 106. The nutrient solution inflow and outflow area is divided into the nutrient solution inflow area and the nutrient solution outflow area by the partition member 107 connected between the side partition plate 106 and the planting tray sidewall 105 configured to define the nutrient solution inflow and outflow area. The planting tray bottom plate 104 on the nutrient solution outflow area is provided with the nutrient solution outlet 102. The nutrient solution inflow area is the liquid inflow buffer tank 108 defined by the partitioning member 107, the planting tray sidewall 105 configured to define the nutrient solution inflow and outflow area and the side partition plate 106. The planting tray 10 further includes the middle partition plate 103 extending from the side partition plate 106 to another planting tray sidewall 105 opposite to the planting tray sidewall 105 configured to define the nutrient solution inflow and outflow area, and a gap is provided between the middle partition plate 103 and the other planting tray sidewall 105. The nutrient solution outflow port 1062 configured to flow the nutrient solution is provided on the side partition plate 106 on the nutrient solution outflow area. The nutrient solution inflow port 1061 is provided on the side partition plate 106 of the nutrient solution inflow area. For example, as shown in FIG. 4, the side partition plate 106 is provided with two notches, preferably arc-shaped notches. In other embodiments, one or more than two notches may be provided. When the nutrient solution flows from the nutrient solution supply system, specifically from the funnel-type flow guiding device 22 into the nutrient solution buffer tank 108, the nutrient solution is buffered by the four walls of the liquid inflow buffer tank 108, so as to make the liquid flow gently. The two or more notches of the nutrient solution inflow port 1061 are configured to uniformize the liquid flow. When flowing over the side partition plates 106, the liquid will uniformly flow to the planting area through the notches. The nutrient solution flows from the nutrient solution inflow area of the planting tray 10, namely the liquid inflow buffer tank 108, to the side of the middle partition plate 103 of the planting area, and then flows into the other side of the middle partition plate 103 of the planting area through the gap between the middle partition plate 103 and the sidewall 105 of the planting tray. After that, the nutrient solution enters the nutrient solution outflow area and flows out through the nutrient solution outlet 102 to form an O-shaped flow route of the nutrient solution, which realizes the inflow and outflow of the nutrient solution on the same side. Further, the planting device and the nutrient solution supply system work collectively to realize a nutrient solution multilayer circulation mode of the plant cultivation.

Figure 6:
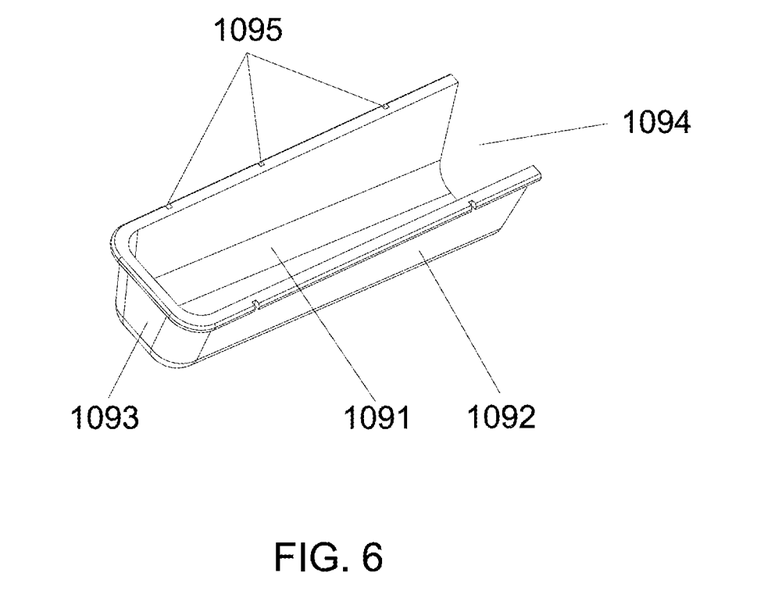
FIG. 6 is a perspective structural schematic diagram showing a liquid receiving tank according to one embodiment of the present invention.
Figure 7:
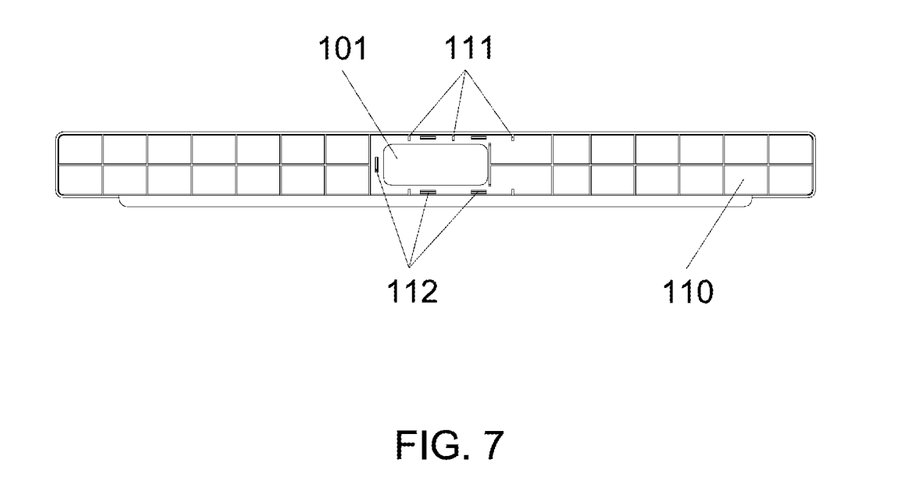
FIG. 7 is a bottom structural schematic diagram showing a limiting plate according to one embodiment of the present invention.
Figure 8:
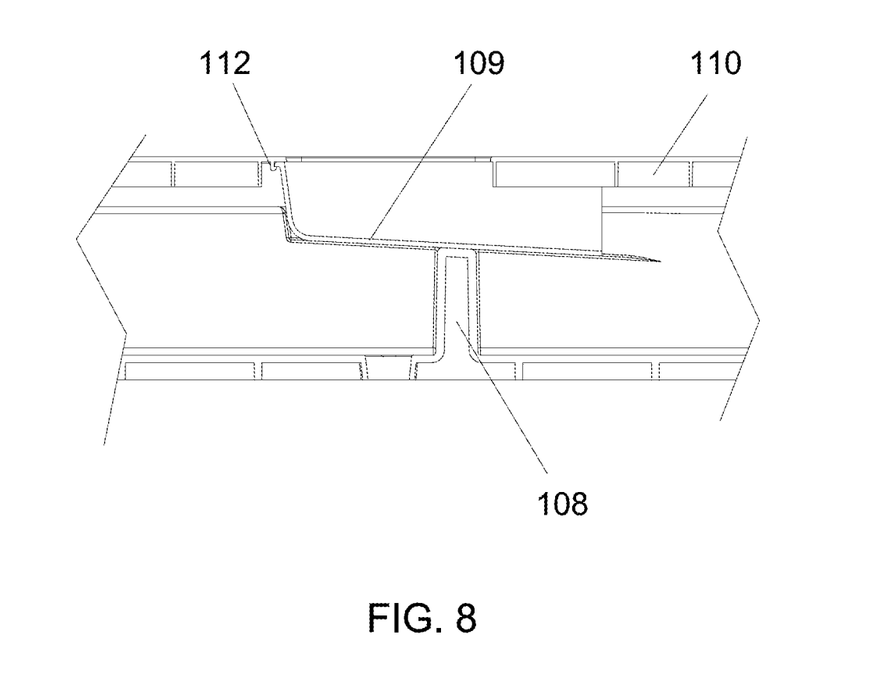
FIG. 8 is a partial front structural schematic diagram showing that the liquid receiving tank is fixed by the limiting plate shown in FIG. 7 according to the present invention.
Figure 9:
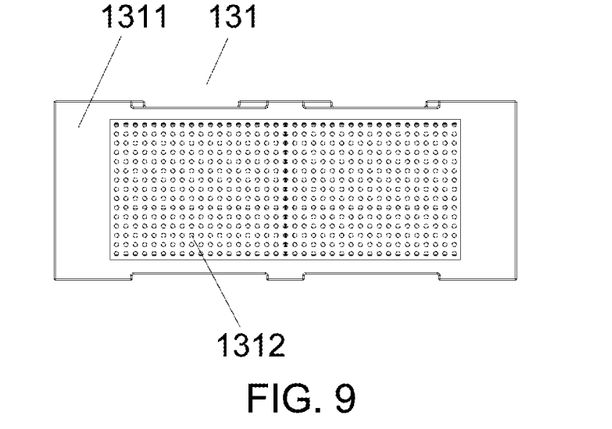
FIG. 9 is a front structural schematic diagram of a filter according to one embodiment of the present invention.

As shown in FIGS. 5-8, the planting device further includes the liquid receiving tank 109. The liquid receiving tank 109 includes the bottom plate 1091, the two sidewalls 1092 opposite to each other, and the end wall 1093. The side opposite to the end wall 1093 is open, namely the end opposite to the end wall 1093 of the liquid receiving tank is an open end 1094. In the present embodiment, the strip-shaped limiting plate 110 is placed on the upper portion of the nutrient solution inflow and outflow area of the planting tray 10, and the liquid receiving tank 109 is installed on the limiting plate 110 through the snap-fit fastener 112 as shown in FIGS. 7 and 8. Besides, the limiting notch 1095 matched with the reinforcing rib 111 on the bottom of the limiting plate is further provided on the sidewall 1092 of the liquid receiving tank (or even the end wall 1093 of the liquid receiving tank), so as to limit the position of the liquid receiving tank 109 by the combination of the limiting notch 1095 and the reinforcing rib 111. After installation, the open end 1094 of the liquid receiving tank 109 is located above the liquid inflow buffer tank 108. In the present embodiment, the specific structure of how the liquid receiving tank 109 is installed on the planting tray 10 is merely an example. In other embodiments, the liquid receiving tank 109 may be installed on the planting tray 10 in other proper manners, e.g. the liquid receiving tank 109 is installed on the sidewall 105 of the planting tray and the side partition plate 106 in a snap-fit manner, without the need of the limiting plate 110. As shown in FIG. 3, in the case where the limiting plate 110 is required, the opening located above the liquid receiving tank 109 is provided in the limiting plate 110, namely the nutrient solution inlet 101. As in the case where the limiting plate 110 is not required, the upper opening of the nutrient solution inflow area of the planting tray may serve as the nutrient solution inlet 101. When the planting device 1 is installed in position on the support rack, the nutrient solution inlet 101 is located below the outlet of the funnel-type flow guiding device 22 of the nutrient solution supply system. As shown in FIG. 6, the bottom plate 1091 of the liquid receiving tank is inclined from the end wall 1093 toward the open end 1094, which facilitates the nutrient solution to flow into the liquid inflow buffer tank 108. Further, the arc-shaped chamfering is formed at the junction portion of the sidewall 1092 and the bottom plate 1091 of the liquid receiving tank may be provided with fillet to reduce the impact when the nutrient solution flows in, thereby facilitating to guide the flow of the nutrient solution. The limiting plate 110 not only can limit the position of the liquid receiving tank, but also has a light-proof function. With the addition of the liquid receiving tank 109 at the inlet of the planting device 1, the pressure from the liquid flow dripping in from the nutrient solution inlet can be buffered, and the liquid flow is prevented from splashing onto the leaf and the ground.

As shown in FIG. 4, in order to make the flow of the nutrient solution in the planting tray 10 more uniform, in the present embodiment, a plurality of strip-shaped liquid blocking ribs 120 perpendicular to the flow direction of the nutrient solution are provided on the bottom plate 104 of the planting tray of the planting area. These liquid blocking ribs 120 divide the planting area into a plurality of liquid storage areas. After entering the planting area, the nutrient solution is blocked by the liquid blocking ribs 120 and gradually distributed uniformly in the first liquid storage area. When reaching a certain height, the nutrient solution flows over the liquid blocking rib 120 and then enters the next liquid storage area. After being uniformly distributed in the present liquid storage area, the nutrient solution then enters the next liquid storage area. By using this structure, the nutrient solution flows in a wavelike manner, and flows in the planting area more uniformly, thereby ensuring that the root system of the plant can sufficiently absorb nutrients. Preferably, the liquid blocking rib 120 is designed as an arc-shaped protrusion to form an arc-shaped liquid blocking structure.

Figure 10:
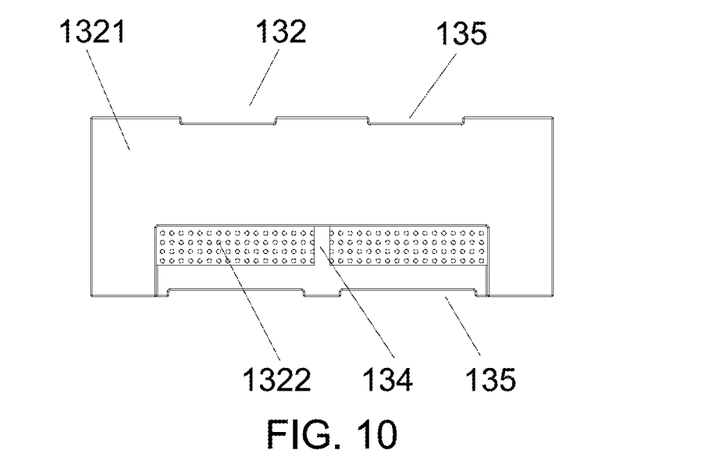
FIG. 10 is a rear structural schematic diagram of the filter shown in FIG. 9.
Figure 11:
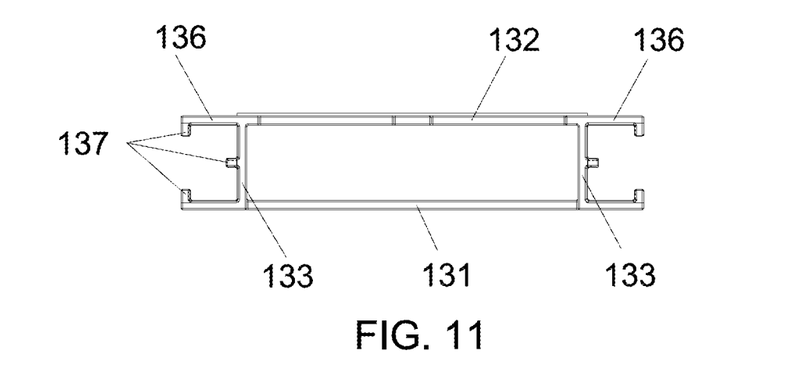
FIG. 11 is a top structural schematic diagram of the filter shown in FIG. 9.
Figure 12:
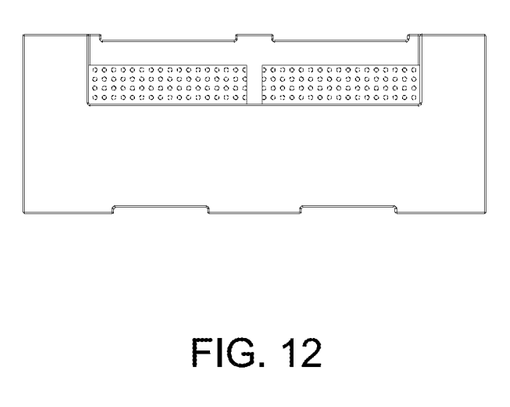
FIG. 12 is a rear structural schematic diagram of the filter shown in FIG. 9 under a deep flow mode.

As shown in FIGS. 9-13, in the above-mentioned embodiment of the planting device 1, the filter 130 is further provided on one side of the nutrient solution outflow area. In this case, the side partition plate 106 on the side of the nutrient solution outflow area is evenly divided into two parts, the space between the two parts is the nutrient solution outflow port 1062. The filter 130 is installed at the nutrient solution outflow port 1062 for filtration and liquid level adjustment. Taking the embodiment shown in FIGS. 9-12 as an example, the structure of the filter will be described hereinafter. The filter is a double-sided structure, including the full-filtration screen 131 and the semi-filtration screen 132. Each filtration screen includes the laterally placed rectangular base plates 1311, 1321 and the filter meshes 1312, 1322 installed in the opening of the base plate. For example, a certain number of nylon fabrics are attached to the base plates 1311, 1321 by an integral injection molding technique to form the filter meshes. The filter mesh 1322 of the semi-filtration screen 132 has a height less than that of the filter mesh 1312 of the full-filter mesh screen 131, e.g. a height half of or less than a half of the height of the filter mesh 1312 of the full-filtration mesh screen 131. The two base plates are parallel to each other, and are connected together by two symmetric vertical plates 133 perpendicular to the base plate. In use, if the filter mesh 1322 of the semi-filter mesh screen 132 is placed at the lower portion, the shallow flow mode (as shown in FIG. 10) is performed; if the filter mesh 1322 of the semi-filter mesh screen 132 is placed at the upper portion, the deep flow mode (as shown in FIG. 12) is performed. The liquid level is controlled to have different heights according to the growing need of the plant by switching between the shallow flow mode and the deep flow mode. In order to strengthen the structure, one or more pillars 134 (as shown in FIG. 10) are additionally provided in the opening of the base plate to avoid deformation of the filter. Although the pillar 134 is merely shown in the semi-filtration screen 132 in FIG. 10, yet the full-filtration mesh screen 131 may also be provided with this structure. In order to make sure that the nutrient solution is automatically drained after stopping the nutrient solution supply, the overflow ports 135 are provided on the top and bottom of the two base plates (as stated above, the top and bottom are opposite to each other, and can be interchanged while using), thereby reducing the workload of discharging the nutrient solution. For example, the nutrient solution in the planting tray 10 can be naturally drained through the overflow port 135 after the nutrient solution supply is cut off at night.

Figure 13:
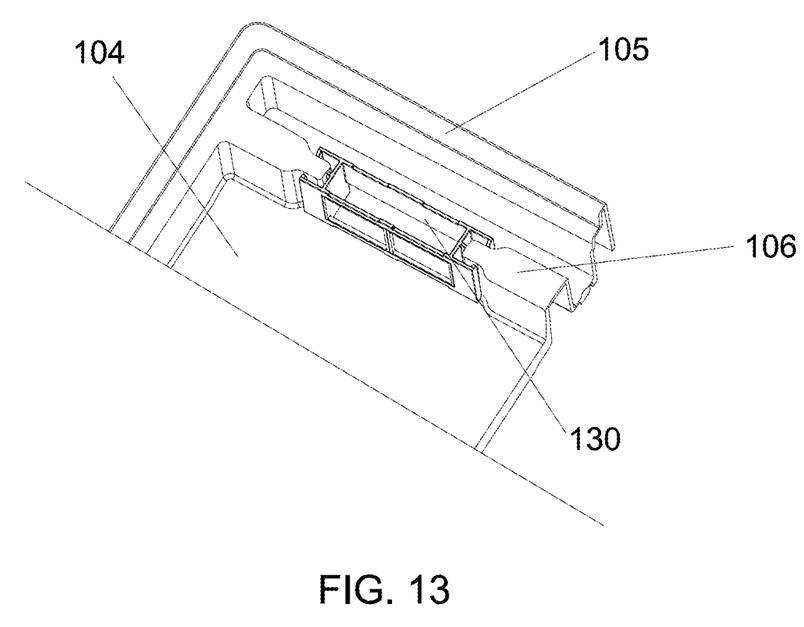
FIG. 13 is a partial perspective structural schematic diagram showing that the filter is installed in the planting tray according to one embodiment of the present invention.

FIGS. 11 and 13 show a fixation mode of the filter. Each of the two ends of the two base plates includes an extension section 136 extending beyond the vertical plate, and the extension sections 136 on the two ends clamp on the side partition plates 106 on both sides of the nutrient solution outlet, thereby achieving the installation and fixation in the planting tray. In order to improve the stability at the fixation position, the vertical rib 137 is provided on the inner side of the end portion of the extension section 136 of the base plate, so that the extension section 136 can clamp on the side partition plate 106 more tightly. In addition, the vertical rib 137 may also be provided on the outer side of the middle portion of the vertical plate 133, and abuts against the end surface of the side partition plates 106 to further increase the stability of the fixation position. By using the vertical ribs 137, the stability of the fixation position is increased, while the water-tightness performance is increased.

As one can conclude from the above description of the embodiments, the multilayer stereo-planting system provided by the present invention solves the problems in the stereo-planting, especially the problems in aspects of liquid supplying, automatic operation, planting device, pipeline cleaning, and environmental control, etc. of stereo-planting with a large amount of layers in height. During the cultivation and harvesting, the planting device, namely the planting tray and the plants on the planting board, is placed in or taken out together in the plug-in manner, and is transported as a whole. By doing so, the plant seedlings are protected from injuries and the leakage and dropping of the nutrient solution can be avoided, thereby facilitating the cleaning and management of the production workshop. Each planting device is independently taken out and placed in without affecting the growth of other plants on the support rack. Each planting device is independently taken out and placed in without affecting the growth of other plants on the support rack. Thus, the problem in separately managing the plants of different species or the plants of the same species but different growth stages in the same workshop can be solved, and the production management is simplified. The modularization of the planting device, especially the plug-in type pick and place facilitates the use of mechanical automation. For example, the quick pick-and-place operation and transportation can be performed by a stacker or a small forklift with rail guidance. The transportation of the nutrient solution in the nutrient solution supply system is realized by the flow guiding device fixed on the support rack. The nutrient solution flows in from the top of the support rack and passes through the flow guiding device in each layer, and is discharged from the bottom for recycling, so as to realize the automatic flow from top to bottom under gravity effect. The flow route on the flow guiding device is relatively independent to the planting device. When the planting device is placed on the support layer, the nutrient solution flows into the planting device of the present layer from the flow guiding device of the upper layer for circulation, and then enters the flow guiding device of the lower layer for the circulation of the lower layer. When no planting device is placed on the support rack, the nutrient solution directly reflows to the liquid discharging pipe in the bottom after passing through the flow guiding devices of every layer for recycling. When the present planting device is taken out, the new planting device is timely placed in. The circulation of the nutrient solution is uninterrupted during the replacement, and there is no need for cutting off the water and power supply, so the nutrient solution will not splash elsewhere. After the planting device is taken out, only the light source module and the nutrient solution supply system still are left on the support rack, and no cleaning is required. The planting devices are taken out and then transported to the operation station together to perform the operations such as planting, harvesting, and planting tray cleaning, etc. The whole board with the newly planted plants is transported together with the planting tray to the support rack for cultivation again, thereby improving the turnover rate of the support rack, while reducing the labor intensity and the working risk for the operators.

The above-mentioned embodiments are merely indicative of the principles and functions of the present invention without any intention of limiting the present invention. A person skilled in the art can make modifications or changes on the above-mentioned embodiments without departing from the spirit and scope of the present invention. Hence, all equivalent modifications or changes made by those of ordinary skill in the art without departing from the spirit and technical ideas of the present invention should also be considered as falling within the scope of the appended claims.

What is claimed is:

1. A planting device, comprising: a planting tray and a planting board, wherein the planting tray comprises a first bottom plate, a first sidewall, and a second side wall; the planting tray comprises a nutrient solution inflow and outflow area and a planting area; the planting board is placed on the planting area;

the nutrient solution inflow and outflow area comprises a nutrient solution inflow area and a nutrient solution outflow area; the nutrient solution inflow area and the nutrient solution outflow area are located on a same side of the planting tray; the first sidewall of the planting tray serves as a sidewall of the nutrient solution inflow and outflow area; the nutrient solution inflow area and the nutrient solution outflow area are separated by a partition member connected to the sidewall of the nutrient solution inflow and outflow area;

a nutrient solution inlet is provided on a top of the planting tray at the nutrient solution inflow and outflow area, and a nutrient solution outlet is provided on the first bottom plate of the planting tray at the nutrient solution outflow area;

a middle partition plate is provided inside the planting tray; the middle partition plate is connected to the partition member, and the middle partition plate extends along a direction perpendicular to the sidewall of the nutrient solution inflow and outflow area within the planting area; and a gap is provided between the middle partition plate and the second sidewall of the planting tray on an opposite side of the sidewall of the nutrient solution inflow and outflow area.

2. The planting device according to claim 1, wherein
a side partition plate is provided inside the planting tray; the side partition plate is arranged in parallel to the sidewall of the nutrient solution inflow and outflow area, and the side partition plate separates the nutrient solution inflow and outflow area from the planting area;
a liquid inflow buffer tank is defined by the partition member, the sidewall of the nutrient solution inflow and outflow area, and the side partition plate located in the nutrient solution inflow area; the side partition plate located in the nutrient solution inflow area is provided with a nutrient solution inflow port; and
the side partition plate located in the nutrient solution outflow area is provided with a nutrient solution outflow port.

3. The planting device according to claim 1, wherein
the planting tray is provided with a liquid receiving tank; the liquid receiving tank comprises a second bottom plate, two third sidewalls opposite to each other, and an end wall; an end of the end wall opposite to the liquid receiving tank is an open end; the liquid receiving tank is fixed at the nutrient solution inlet of the planting tray; and the open end faces toward the nutrient solution inflow area.

4. The planting device according to claim 1, wherein
a plurality of liquid blocking ribs parallel to the sidewall of the nutrient solution inflow and outflow area are provided on the first bottom plate of the planting tray and the planting area to divide the planting area into a plurality of liquid storage areas.

5. The planting device according to claim 2, wherein
a filter is provided at the nutrient solution outflow port; the filter comprises a full-filtration screen and a semi-filtration screen; the full-filtration screen and the semi-filtration screen each comprise a laterally placed rectangular base plate and a filter mesh installed in an opening of the base plate; two base plates of the full-filtration screen and the semi-filtration screen are parallel to each other and identical in height; the two base plates are fixed with a space; and a height of the filter mesh of the semi-filtration screen is less than a height of the filter mesh of the full-filtration screen.

6. The planting device according to claim 5, wherein
two ends of the filter are respectively embedded in the side partition plates at two sides of the nutrient solution outflow port in a snap-fit manner.

7. A multilayer stereo-planting system, comprising a support rack, and a nutrient solution supply system installed on the support rack, wherein
the multilayer stereo-planting system further comprises the planting device according to claim 1; the planting device is installed on the support rack and is configured to be disassembled as a whole;
the nutrient solution supply system comprises a main nutrient solution pipeline installed on a top of the support rack, funnel-type flow guiding devices, and a liquid discharging pipe installed on a bottom of the support rack; the funnel-type flow guiding devices are installed on each layer of the support rack, and the funnel-type flow guiding devices are located above the nutrient solution inlet of the planting device; and the funnel-type flow guiding devices are arranged as one line or multiple lines along a vertical center line from top to bottom.

8. The multilayer stereo-planting system according to claim 7, wherein
the multilayer stereo-planting system comprises a ventilation and heat dissipation system; the ventilation and the heat dissipation system comprises a main cool air pipeline, a main $CO_2$ pipeline, a branch cool air pipeline, and a branch $CO_2$ pipeline, wherein the main cool air pipeline and the main $CO_2$ pipeline are installed at the top of the support rack, the branch cool air pipeline and the branch $CO_2$ pipeline respectively extend downward from the main cool air pipeline and the main $CO_2$ pipeline; and the branch cool air pipeline and the branch $CO_2$ pipeline are each provided with a plurality of air outlets at each layer of the support rack.

9. The multilayer stereo-planting system according to claim 7, wherein
the multilayer stereo-planting system further comprises light source modules installed on each layer of the support rack.

10. A planting system of a plant factory, comprising the multilayer stereo-planting system according to claim 7.

11. The planting device according to claim 2, wherein
the planting tray is provided with a liquid receiving tank; the liquid receiving tank comprises a second bottom plate, two third sidewalls opposite to each other, and an end wall; an end of the end wall opposite to the liquid receiving tank is an open end; the liquid receiving tank is fixed at the nutrient solution inlet of the planting tray; and the open end faces toward the nutrient solution inflow area.

12. The multilayer stereo-planting system according to claim 7, wherein
a side partition plate is provided inside the planting tray; the side partition plate is arranged in parallel to the second sidewall of the nutrient solution inflow and outflow area, and the side partition plate separates the nutrient solution inflow and outflow area from the planting area;
a liquid inflow buffer tank is defined by the partition member, the second sidewall of the nutrient solution inflow and outflow area, and the side partition plate located in the nutrient solution inflow area; the side partition plate located in the nutrient solution inflow area is provided with a nutrient solution inflow port; and
the side partition plate located in the nutrient solution outflow area is provided with a nutrient solution outflow port.

13. The multilayer stereo-planting system according to claim 7, wherein
the planting tray is provided with a liquid receiving tank; the liquid receiving tank comprises a second bottom plate, two third sidewalls opposite to each other, and an end wall; an end of the end wall opposite to the liquid receiving tank is an open end; the liquid receiving tank is fixed at the nutrient solution inlet of the planting tray; and the open end faces toward the nutrient solution inflow area.

14. The multilayer stereo-planting system according to claim 7, wherein
a plurality of liquid blocking ribs parallel to the second sidewall of the nutrient solution inflow and outflow area are provided on the first bottom plate of the planting tray and the planting area to divide the planting area into a plurality of liquid storage areas.

15. The multilayer stereo-planting system according to claim 7, wherein a filter is provided at the nutrient solution outflow port; the filter comprises a full-filtration screen and a semi-filtration screen; the full-filtration screen and the semi-filtration screen each comprise a laterally placed rectangular base plate and a filter mesh installed in an opening of the base plate; two base plates of the full-filtration screen and the semi-filtration screen are parallel to each other and identical in height; the two base plates are fixed with a space; and a height of the filter mesh of the semi-filtration screen is less than a height of the filter mesh of the full-filtration screen.

16. The multilayer stereo-planting system according to claim 7, wherein two ends of the filter are respectively embeded in the side partition plates at two sides of the nutrient solution outflow port in a snap-fit manner.

17. The planting system of a plant factory according to claim 10, wherein the multilayer stereo-planting system comprises a ventilation and heat dissipation system; the ventilation and the heat dissipation system comprises a main cool air pipeline, a main $CO_2$ pipeline, a branch cool air pipeline, and a branch $CO_2$ pipeline, wherein the main cool air pipeline and the main $CO_2$ pipeline are installed at the top of the support rack, the branch cool air pipeline and the branch $CO_2$ pipeline respectively extend downward from the main cool air pipeline and the main $CO_2$ pipeline; and the branch cool air pipeline and the branch $CO_2$ pipeline are each provided with a plurality of air outlets at each layer of the support rack.

18. The planting system of a plant factory according to claim 10, wherein the multilayer stereo-planting system further comprises light source modules installed on each layer of the support rack.

\* \* \* \* \*